June 28, 1955 W. R. JEWELL 2,711,943
CONTAINER AND TRIM STRIP ASSEMBLY
Filed July 12, 1954

*INVENTOR.*
WILLIAM R. JEWELL
BY
HIS ATTORNEY

United States Patent Office 2,711,943
Patented June 28, 1955

2,711,943

CONTAINER AND TRIM STRIP ASSEMBLY

William R. Jewell, Lyndon, Ky., assignor to General Electric Company, a corporation of New York Application July 12, 1954, Serial No. 442,477

5 Claims. (Cl. 312—330)

The present invention relates to a container and trim strip assembly and is more particularly concerned with an arrangement for securely and conveniently attaching a decorative strip to an edge of a container.

The containers or pans provided in a household refrigerator for the storage of vegetables and similar food items are ordinarily of rectangular shape and are made of an acid resistant material such as a plastic or enameled steel. To improve the appearance of such containers there is ordinarily provided along the front edge of the container a decorative strip of aluminum or the like which while not as acid resistant as the material from which the container or pan is made, is nevertheless of a more pleasing appearance. Since the trim and the container are separately made of different materials, it is necessary to provide some means for fastening the trim strip to the container.

The various arrangements previously employed for this purpose have not been particularly satisfactory. Since the primary purpose of the trim strip is to improve the general appearance of the container, it should cover both the forward edge portion of the pan and also any fastening means. The various fastening arrangements previously used have in themselves been complicated and expensive and the labor involved in mounting the trim strip on the pan has also been costly. Also in the case of some fastening arrangements, portions of the fastening element, such as an end of a bolt, screw or the like have extended into the interior of the pan and thus constituted a source of irritation to the user during cleaning of the pan.

Accordingly it is a primary object of the present invention to provide an improved container and trim strip arrangement including low-cost means for quickly and effectively securing the trip strip to the edge of the pan.

A further object of the invention is to provide a simple and effective means of attaching a trim strip to a container edge, which means is completely hidden from view by the trim strip and does not interfere with normal use of the container.

Another object of the invention is to provide in combination with a container and a trim strip, means for fastening the trim strip to the edge of the container without the use of any special tools, mounting fixtures or the like.

Further objects and advantages of the invention will become apparent as the following description proceeds and the features of novelty which characterize the invention will be pointed out with particularity in the claims annexed to and forming a part of this specification.

In carrying out the objects of this invention there is provided a container and handle assembly comprising a container including flanges along the side edges thereof and a trim strip member including a securing portion extending across the front edge of the container with the ends thereof overlapping the side flanges. Coextensive slots are provided in each end of the trim strip and in the side flanges of the pan. Also provided adjacent the ends of the trim strip securing portion are apertures spaced from the slots or recesses and in cooperation with the slots or recesses to provide means for accommodating a fastening means for securing the strip to the container. The fastening means includes a substantially flat body portion having one end return bent to provide a clip portion engaging one of the flanges and an end portion of the trim strip within the coextensive slots and anchoring means including a tongue struck or pressed from the flat body portion of the fastening means and adapted to cooperate with the corresponding aperture in the trim strip securing portion to anchor the fastening means and prevent the return bend clip portion from becoming disengaged from the pan and trim strip.

For a better understanding of the invention reference may be had to the accompanying drawing in which Fig. 1 is a plan view, partially in section of the container and trim strip assembly of the present invention;

Figure 1:
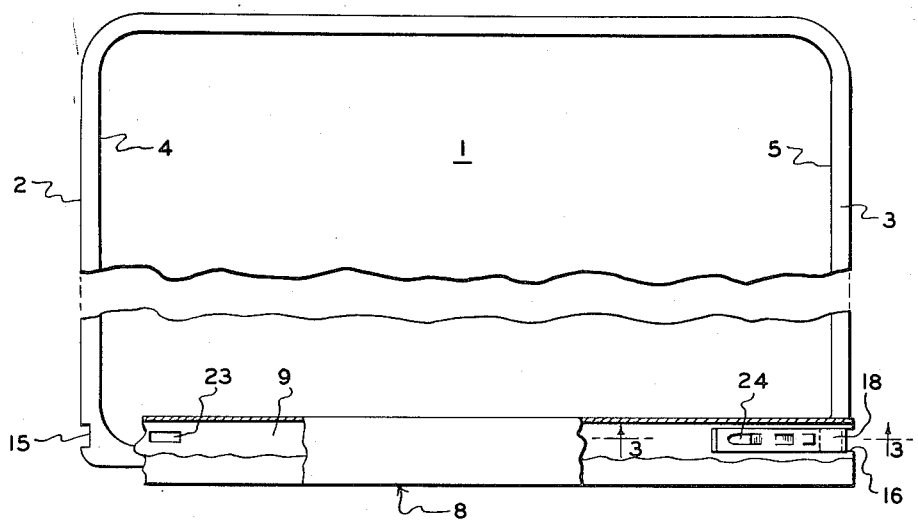
Figure 2:
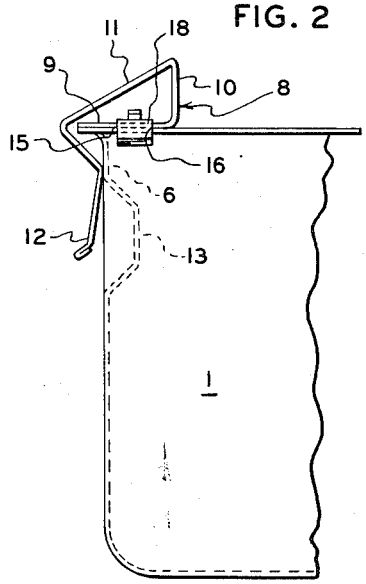
Fig. 2 is a partial side view of the assembly of Fig. 1.
Figure 3:
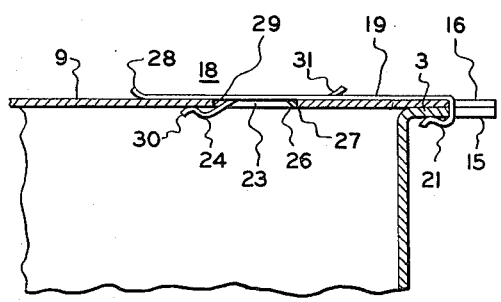
Fig. 3 is a cross-sectional view taken along the line 3—3 of Fig. 1.

Referring to the drawing there is shown a container or pan 1 of the type used for the storage of vegetables and similar food articles in a household refrigerator. The pan is of a generally rectangular shape and includes flanges 2 and 3 extending horizontally outwardly from the upper edges of the side walls 4 and 5. These flanges are normally employed for slidably supporting the pan in rail or slide members (not shown) mounted on the walls of the refrigerator cabinet. In order to improve the appearance of the forward edge 6 of the pan 1 which is exposed to view when the refrigerator door is open and, in the modification shown, to provide a handle for use in sliding the pan 1 outwardly from the cabinet to a more accessible position there is provided a trim strip 8 extending across the entire forward edge 6 of the pan with the opposite ends of the trim strip overlapping the flanges 2 and 3 along the side edges of the container 1.

In the illustrated modification the trim strip 8 includes a flat horizontal securing portion 9 in contact with the forward edge 6 of the pan with the opposite ends thereof overlapping side flanges 2 and 3 and terminating adjacent the outer edges of the flanges. This horizontal portion 9 is employed for securing the trim strip 8 to the pan and is ordinarily hidden from view by the remaining portions of the trim strip which include a portion 10 extending upwardly from the rear side of the securing portion 9 and a downwardly and forwardly extending portion 11 terminating adjacent the front edge 6 of the pan. The portions 10 and 11 are of course at least of the same length as the securing portion 9. To provide handle means for removing the pan from the refrigerator cabinet, there may also be included as part of the trim strip a downwardly extending portion 12 integral with the sloping portion 11 and spaced from the adjacent portion 13 of the forward wall of the pan 1 a sufficient distance so that the portion 12 can be grasped between the fingers when it is desired to pull the container 1 forwardly from the refrigerator cabinet to an accessible position. There are also provided square or rectangular recesses or slots 15 adjacent the forward ends of the flanges 2 and 3 and coextensive and cooperating slots 16 at the two ends of the trim strip securing portion 9 overlapping flanges 2 and 3. These coextensive slots in cooperation with a fastening device 18 provide simple and effective means for securely fastening the trim strip 8 onto the container 1.

The fastening device 18 preferably made of spring sheet metal comprises a flat body portion 19 of generally rectangular shape overlying the upper surface of the securing portion 9. One end of the body portion is bent downwardly and backwardly upon itself to form a clip portion 21 adapted to be snugly received in the coextensive recesses 15 and 16 to hold the securing portion 9 of the trim strip 8 firmly in engagement with the corresponding flange 2 or 3. As the return-bent clip portion 21 is of substantially the same width as the slots 15 and 16, the clip portion also secures the trim strip 8 against lateral or horizontal movement relative to the container edge 6.

In order to anchor the fastening device 18 and hold the clip member 21 in the coextensive slots in engagement with the securing portion 9 and the cooperating flange of the container 1, there are provided apertures 23 adjacent each end of the securing portion 9 adapted to receive a tongue 24 struck out or pressed from the body portion 19 of the fastening device. This downwardly extending tongue 24 passes through the aperture 23 and then laterally into contact with the lower surface of the securing portion 9 in order to hold the flat body portion 19 of the fastening device firmly in contact with the upper surface of the securing portion 9. A prong 26 on the under side of the body portion 19 is adapted to prevent accidental withdrawal of the fastening device. This prong is struck from the body portion 19 of the fastening device and inclines downwardly in the direction of the clip portion 21. The free end of the prong 26 is spaced from the tongue 24 a distance sufficient so that when the tongue 24 is in engagement with the underside of the securing portion 9, the free end of the prong 26 abuts the wall 27 of the aperture 23 and together with the tongue 24 retains the fastening device 18 in proper position.

The advantages of the present invention will become more apparent from a consideration of the ease with which the trim strip 8 can be mounted along the front edge of the container 1. After the trim strip 8 is placed over the forward edge 6 of the container 1 with the recesses 15 and 16 aligned, a fastener 18 is inserted into each open end of the trim strip 8 with the body portion 19 of the fastener overlying the securing portion 9. To facilitate the assembly operation the forward edge or end of the fastener 18 is flared upwardly as indicated at 28 so that there will be no tendency for this end to engage the wall 29 of the aperture 23 as the fastener is moved into its securing position. After the forward end 28 of the clip passes over the aperture 23, the tongue 24 drops through the aperture and its forward end 30 which is flared downwardly passes beneath the securing portion 9 and serves to hold the body portion 19 in direct engagement with the upper surface of the securing portion 9. At the same time, the clip member 21 passes into the cooperating slots 15 and 16 with the lower side of the clip member engaging the underside of the flange 2 or 3 on the container 1 in such a manner that the flanges are firmly clamped to the securing portion 9 of the trim strip. The free end 27 of the prong 26 is so arranged that after the clamping member 21 has engaged the container flange, it drops into the aperture 23 in abutting relationship with the aperture wall 27 so that the clip cannot be accidentally removed or displaced during normal use of the assembly. After assembly the trim strip 8 not only covers the forward edge 6 of the container 1 but also the fastening means which is completely within the hollow end of the trim strip when in its operating position.

To facilitate the insertion of the fastening device 18 within the trim strip there is also provided a tab 31 struck upwardly from the body portion 19 of the fastener a distance sufficient to accommodate the end of a screw driver or similar tool which can be employed as a means for imparting forward movement to the fastening device and also to maintain the body portion 19 in engagement with the securing portion 9 of the trim strip until the tongue 24 has passed beneath the trim strip in engagement with its underside. In the event it becomes necessary to remove the trim strip from the container, pressure is applied upwardly through the aperture 23 against the underside of the body portion 19 to raise the free end of the prong 26 out of engagement with the aperture wall 27 whereupon the clip can be slid outwardly from the end of the trim strip to release the clamping member 21.

While there has been shown and described a specific embodiment of the present invention, it is to be understood that the invention is not limited to the particular construction shown and described and it is intended by the appended claims to cover all modifications within the spirit and scope of the invention.

What I claim as new and desire to secure by Letters Patent of the United States is:

1. A container and trim strip assembly comprising a container including flanges along the side edges thereof, a trim strip extending across the front edge of said container and including a securing portion with the ends thereof overlapping and in contact with said flanges, said side flanges and said ends being provided with coextensive slots, said securing portion having an aperture adjacent each end thereof, and fastening means securing said trim strip to said container and including a substantially flat body portion having one end return-bent to provide a clip portion engaging one of said flanges and the corresponding end of said securing portion within said coextensive slots, and anchoring means including a tongue struck from said body portion and out of the plane thereof and extending through said aperture into gripping engagement with said securing portion.

2. A container and trim strip assembly comprising a container including flanges along the side edges thereof, a trim strip extending across the front edge of said container and including a securing portion with the ends thereof overlapping and in contact with said flanges, said side flanges and said ends being provided with coextensive slots, said securing portion having an aperture adjacent each end thereof, and fastening means securing said trim strip to said container and including a substantially flat body portion having one end return-bent to provide a clip portion engaging one of said flanges and the corresponding end of said securing portion within said coextensive slots, and anchoring means including a tongue struck from said body portion and out of the plane thereof and extending through said aperture into gripping engagement with said securing portion and a prong engaging the wall of said aperture opposite said tongue.

3. A container and trim strip assembly comprising a container including flanges along the side edges thereof, a trim strip extending across the front edge of said container and including a securing portion with the ends thereof overlapping and in contact with said flanges, said side flanges and said ends being provided with coextensive slots, said securing portion having an aperture adjacent each end thereof, and fastening means securing said trim strip to said container and including a substantially flat body portion overlying said securing portion and having one end return-bent to provide a clip portion including a downwardly extending section passing through said coextensive slots and a horizontal terminal portion engaging the underside of the corresponding flange, and anchoring means including a tongue struck from said body portion and out of the plane thereof and extending through said aperture into gripping engagement with said securing portion.

4. A container and combination trim strip-handle assembly comprising a substantially rectangular container including front and side walls horizontal flanges extending outwardly from the upper edges of the side walls thereof, a trim strip and handle member extending across the front of said container and including a flat horizontal securing portion extending across the front edge of said container with the rear portion thereof extending over the interior of said container and the ends thereof superimposed on and terminating adjacent the outer edges of said flanges, said flanges and the ends of said securing portion having coextensive rectangular slots therein, said securing portion including an aperture adjacent each end thereof, and fastening means for securing said securing portion to said pan, said fastening means comprising a substantially flat body portion contacting the upper surface of said securing portion, said body portion having one end return-bent to provide a clip member snugly received in said coextensive slots to hold said flange and said securing portion in engagement, a tongue pressed from said flat body portion, said tongue extending downwardly through said aperture and then laterally with the end section thereof bearing against the bottom surface of said securing portion, and a prong projecting downwardly from said body portion in engagement with the wall of said aperture opposite said tongue to anchor said fastening means on said securing portion.

5. A container and combination trim strip-handle assembly comprising a substantially rectangular container including front and side walls horizontal flanges extending outwardly from the upper edges of the side walls thereof, a trim strip and handle member extending across the front of said container and including a flat horizontal securing portion extending across the front edge of said container with the rear portion thereof extending over the interior of said container and the ends thereof superimposed on and terminating adjacent the outer edges of said flanges, said flanges and the ends of said securing portion having coextensive rectangular slots therein, said securing portion including an aperture adjacent each end thereof, and fastening means for securing said securing portion to said pan, said fastening means comprising a substantially flat body portion contacting the upper surface of said securing portion, said body portion having one end return-bent to provide a clip member snugly received in said coextensive slots to hold said flange and said securing portion in engagement, and means to anchor said fastening means comprising a tongue pressed from said flat body portion and extending downwardly through said aperture and then laterally with the end section thereof bearing against the bottom surface of said securing portion, and a prong projecting downwardly from said body portion in engagement with the wall of said aperture opposite said tongue.

No references cited.